Aug. 1, 1933.  J. G. BLUNT  1,920,348
RAILROAD TRUCK CENTERING DEVICE
Filed Nov. 4, 1930  2 Sheets-Sheet 1
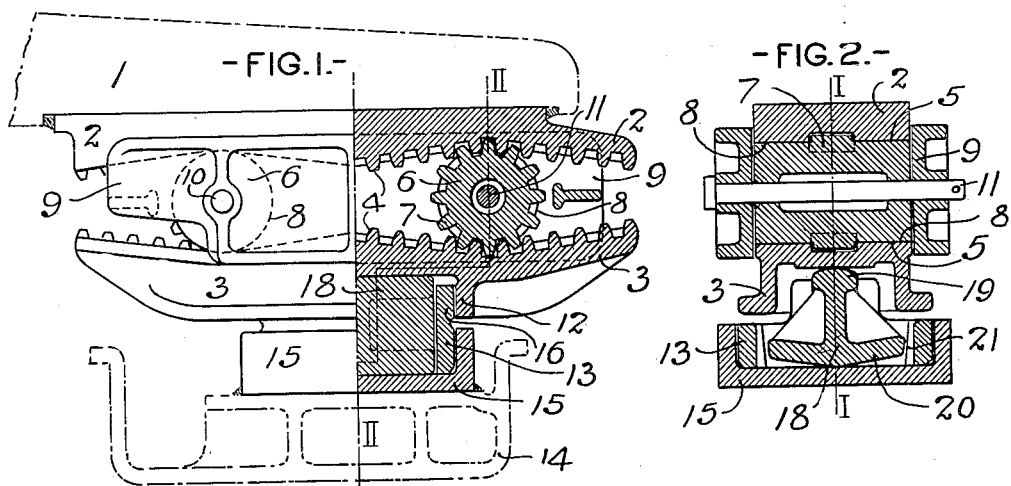
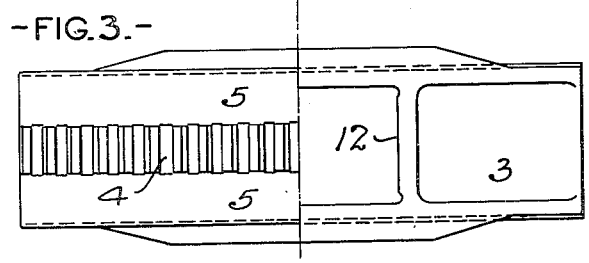
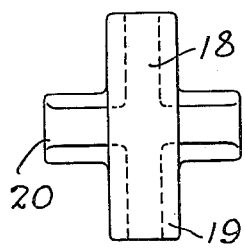
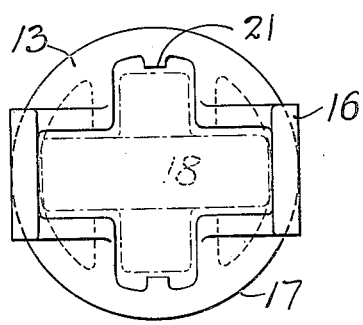
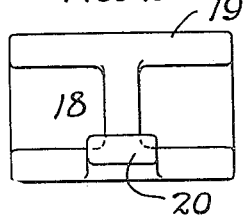
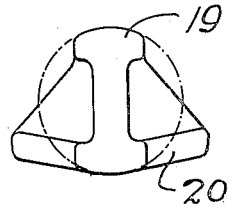
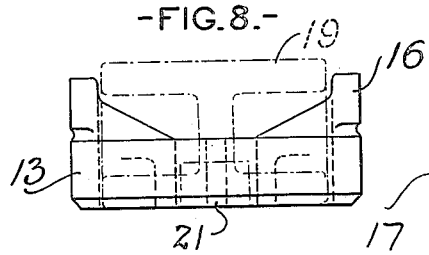
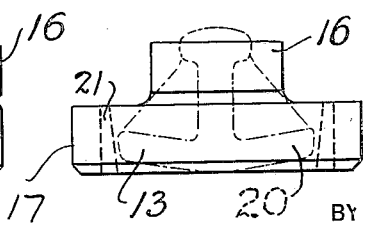
INVENTOR
James G. Blunt
BY
SC Yeaton
ATTORNEY

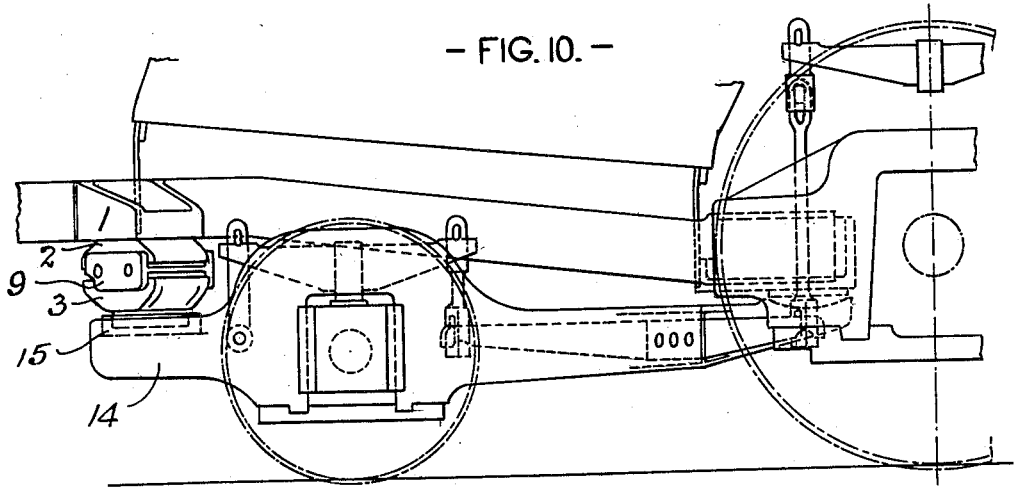
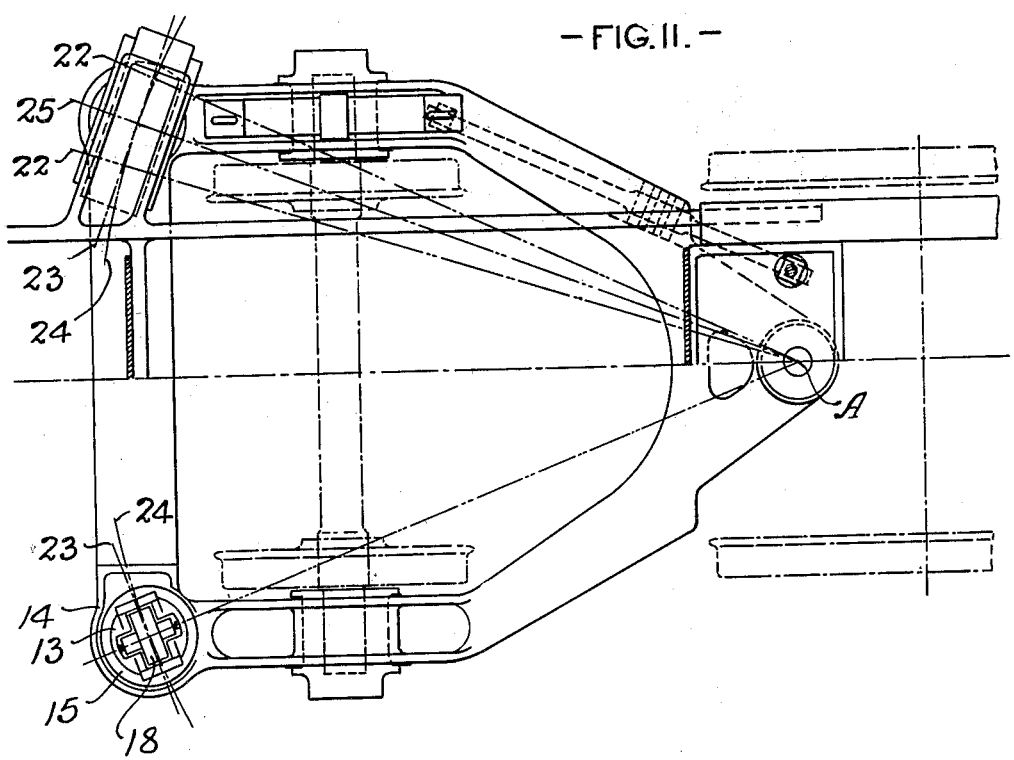

Patented Aug. 1, 1933

1,920,348

UNITED STATES PATENT OFFICE 1,920,348

RAILROAD TRUCK CENTERING DEVICE

James G. Blunt, Schenectady, N. Y.

Application November 4, 1930. Serial No. 493,285

13 Claims. (Cl. 308—226.)

This invention relates to centering devices for railroad trucks, of the type adapted to permit a relative lateral movement between the truck and the frame of the locomotive when traversing curved track and to bring the parts back to normal position upon returning to tangent track.

An extensively used type of such a device comprises an arrangement, disposed between the truck and the frame, of rollers applied between reversely inclined surfaces of roller seats, so as to exert resistance to the lateral movement of one roller seat relative to the other when traversing curved track, the tendency of the roller seats to return to a position with the rollers at intersections of the inclines serving to bring the truck and the frame back to their normal relative positions. In the use of such a centering device, however, there is also a relative longitudinal and rotative movement of the truck and the frame which effects the roller seats, that is to say, a variation in the positions of the roller seats tends to result by reason of the radial movement of the truck and the consequent relative straight line movement of the frame. This variation must be compensated for in order to attain smooth and efficient operation. It will be understood that where the word "lateral" is used both in the specification and claims herein, it is intended to mean a direction which is lateral or transverse with respect to the locomotive.

The object of the present invention is to provide an improved device of the aforesaid character wherein the said longitudinal and rotary movements of the truck relative to the locomotive frame will be compensated for, and which device will be of a simple yet durable and practical construction.

It will be understood that while the invention is described herein as applied to a locomotive, it may be used on any vehicle where it will prove serviceable and that all such changes and modifications in the details of construction of the device which may be found desirable and will be apparent to those skilled in the art, are contemplated as within the spirit of this invention as defined in the appended claims.

In the accompanying drawings Figure 1 is a side view of a centering device embodying the invention, the right half being in section taken on the line I—I of Fig. 2; Fig. 2 is a section taken on the line II—II of Fig. 1; Fig. 3, on the left side is a plan view, and on the right side is an inverted plan view of the lower roller seat; Figs. 4 to 9 inclusive are enlarged views; Fig. 4 is a side view of the rocker; Fig. 5 is an end view of same; Fig. 6 is a plan view of same; Fig. 7 is a plan view of the rocker guide, with the rocker shown in broken lines therein; Fig. 8 is a side view of same; Fig. 9 is an end view of same; Fig. 10 is a fragmentary side view of the back end of a locomotive showing the invention applied thereto; and Fig. 11 is a plan view of same, certain parts being omitted.

In describing the apparatus of the present invention, it will be understood that there will be a centering device, or lateral motion adjusting unit, disposed on each side of the locomotive, at an angle to the axis of the locomotive in the usual manner, as shown in Fig. 11. Both of the devices being of identical construction, only one will be described in the detailed description hereinafter following.

Referring in detail to the specific embodiment of the invention as herein exemplified, a lower portion of a locomotive frame 1, is indicated by broken lines in Fig. 1, and secured thereto is an upper roller seat 2. Disposed beneath the seat 2, is a lower roller seat 3, the two seats having teeth 4 formed centrally along their inner faces between the bearing surfaces 5 thereof. Rollers 6 are positioned between the seats 2 and 3, and have teeth 7 formed centrally thereon and adapted to mesh with the teeth 4 of the seats so as to produce a positive rotation of the rollers when the seats are moving laterally in opposite directions, their outer surfaces 5 bearing upon the bearing surfaces 8 of the rollers. The rollers are yoked together by a frame 9 to maintain them and the seats in normal relation to each other and to protect the teeth from dirt or foreign matter. The frame 9 is formed of a casting having an open top and bottom. The frame encloses the rollers and has bearings 10 formed in its sides for the pins 11 of the rollers. The sides of the frame overlap the seats 2 and 3, holding the seats in their proper vertical and parallel alignment.

The inner side of the upper roller seat is inclined upwardly and then downwardly, from the middle of the seat at both sides thereof, and the inner side of the lower seat is inclined downwardly and then upwardly, from its middle at both sides thereof, the degree of inclination being predetermined so as to effect the desired degree of centering effort or lateral resistance. In normal position the axes of the rollers will be in line with the intersection of the reverse inclines of the seats, and while a relative lateral movement between the truck and the frame will be permitted upon traversing curved track, by the relative movement of the seats, the resistance afforded to the same will effect the subsequent return of the parts to their normal positions.

On the lower roller seat 3 depending flanges 12 are formed. A guide member 13 is disposed between the lower seat and the truck 14, in a socket 15 mounted on the truck. Extensions 16 are formed on the sides of the guide member 13 and adapted to coact with the flanges 12, to ensure the rotation of the guide member with the seats while permitting the seat 3 to move in a transverse direction relative to its lateral movement with relation to the truck. The lower portion 17 of the guide 13 is cylindrically shaped and adapted to rotate in the socket 15 which is correspondingly shaped, so that the lower roller seat when moving with the guide member may rotate about this point on the truck and preserve the parallel alignment of the upper and lower roller seats throughout the lateral range of movement. Disposed within the guide member 13, a weight transmitting rocker or roller member 18 rests on the floor of the socket 15 and supports the lower seat 3 on its upper end 19 which is shaped to afford a rounded bearing surface. The rocker comprises the lower, upwardly slanting, extensions or arms 20, the ends of which are adjacent rib members 21 formed on the inner sides of the guide member. The rocker is thus interlocked with the guide member 13 to rotate therewith, but is free to rock relative thereto. The lower roller seat 3, by reason of this arrangement and construction of the rocker is permitted to roll on the head 19 of the same, transversely to its lateral movement to compensate for the relative longitudinal movement of the truck and the frame and to maintain its vertical alignment with the upper seat. The extensions 20 limit the travel of the rocker and confine it between the ribs 21, so as to effect a positive rolling motion.

Referring to Figure 11, the invention is here diagrammatically illustrated as applied to a two-wheel truck pivotally connected by a radius bar pin indicated at A to the main frame of a locomotive. The line 25 indicates the center position of one of the lateral motion devices when the locomotive frame and truck frame are in relative normal positions on a straight track, the line being drawn from the radius bar pin through said center of the device. It will be apparent that in the operation of the locomotive, in which the centering device embodying the invention is employed between its frame and one of its trucks, when traversing a curved section of track, by reason of the roller and seat arrangement, the truck and frame will be allowed the necessary relative lateral movement as indicated by the lines 22 that is, these lines are drawn from the radius bar pin through the center of the lower roller seat, in the positions taken by the same when laterally moved in opposite directions with relation to the upper roller seat and locomotive frame. The line 23 indicates the line of travel of the center of the roller seats of the lateral motion device and the arc 24 indicates the line of travel of the center of the guide member 13 on the truck. During the relative movement of the truck and the locomotive frame the revolving movement of the rocker and guide member within the socket permits the parallel alignment between the roller seats to be undisturbed; and the rolling of the lower seat on the rocker transversely to the lateral movement permits the relative vertical straight alignment of the seats to be maintained. The truck and locomotive frame are, as aforesaid, brought back to their relative normal position upon returning to tangent track.

The invention claimed and desired to be secured by Letters Patent is:

1. A device for interposition between a locomotive superstructure portion and a truck portion for transmitting a part of the load of the former to the latter, said portions being connected for relative angular movement, comprising a centering device having upper and lower relatively movable parts, one of the parts being adapted to be disposed adjacent one of the portions and to move therewith; and a separate rocker member having oppositely disposed upper and lower faces, one of said faces being in rolling engagement with the other of said parts, and the other of said faces being adapted for rolling engagement with the other of said portions, said parts and rocker member being adapted to cooperate to transmit said load to the truck portion and being normally in vertical alignment, and said rocker member being adapted to rotate relative to the portion to which it is adapted for engagement and with said engaged part upon said relative movement of said parts.

2. A device for interposition between a locomotive superstructure and a truck for transmitting a part of the load of the former to the latter, said superstructure and truck being connected for relative angular movement, comprising a centering device having an upper part adapted to be engaged with the superstructure to move therewith and a lower part movable relative to the upper part; and a separate rocker member having oppositely disposed upper and lower faces, the upper face being in rolling engagement with the lower part and the lower face being adapted for rolling engagement with the truck, said parts and rocker member being adapted to cooperate to transmit said load to said truck and being normally in vertical alignment, and said rocker member being adapted for rotation relative to the truck and with said lower part, upon said relative movement of said parts.

3. A device for interposition between a locomotive superstructure portion and a truck portion for transmitting a part of the load of the former to the latter, said portions being connected for relative angular movement, comprising a centering device having upper and lower relatively movable parts, one of the parts being adapted to be disposed adjacent one of the portions and to move therewith; a separate rocker member having oppositely disposed upper and lower faces, one of said faces being in rolling engagement with the other of said parts, and the other of said faces being adapted for rolling engagement with the other of said portions, said parts and rocker member being adapted to transmit said load to the truck portion and being normally in vertical alignment; and means operably connecting the centering device with the rocker member, adapting the rocker member for positive rotation relative to the portion with which it is adapted for engagement, during the relative angular movement of the portions.

4. A device for interposition between a locomotive superstructure and a truck for transmitting a part of the load of the former to the latter, said superstructure and truck being connected for relative angular movement, comprising a centering device having an upper part adapted to be engaged with the superstructure to move therewith, and a lower part movable relative to the upper part; a separate rocker member having oppositely disposed upper and lower faces, the upper face being in rolling engagement with the lower part and the lower face being adapted for rolling engagement with the truck, said parts and rocker member being adapted to cooperate to transmit said load to the truck and being normally in vertical alignment; and means operably connecting the centering device with the rocker member, adapting the rocker member for positive rotation relative to the truck, during the relative angular movement of the truck and superstructure.

5. A device for interposition between a locomotive superstructure portion and a relatively laterally movable truck portion for transmitting a part of the load of the former to the latter, comprising a centering device having upper and lower relatively moving parts, one of the parts being adapted to be disposed adjacent one of the portions and to move therewith laterally relative to the other portion; a separate rocker member having oppositely disposed upper and lower faces, one of said faces being in rolling engagement with the other of said parts, and the other of said faces being adapted for rolling engagement with the other of said portions, said parts and rocker member being adapted to cooperate to transmit said load to the truck portion and being normally in vertical alignment; and means adapted to compel said rocker member and centering device to rotate with one portion relative to the other portion upon relative lateral movement of the portions.

6. In a centering device for a railroad truck comprising upper and lower roller seats having rollers interposed therebetween to provide for their relative lateral movement and adjustment, means comprising a guide member rotatably disposed beneath the lower seat, and a rocker member within said guide member adapted for support on said truck and supporting said seats, adapted to permit parallel and vertical alignment of said seats to be maintained during said relative lateral movement.

7. In a centering device for a railroad truck, the combination of upper and lower roller seats having rollers interposed therebetween to provide for their relative lateral movement and adjustment, a frame adapted to maintain said seats and rollers in alignment, a socket adapted to be secured on the truck, a guide member rotatably disposed in said socket, and a rocker member operatively disposed in said guide member supporting said seats, whereby parallel and vertical alignment of said seats will be permitted during said relative lateral movement.

8. In a centering device for a railroad truck, the combination of upper and lower roller seats having rollers interposed therebetween to provide for their relative lateral movement and adjustment, a frame adapted to maintain said seats and rollers in alignment, a guide member rotatably disposed beneath the lower seat and having upward extensions formed on its sides, said lower seat having downwardly extending flanges adapted to co-act with said extensions to effect positive rotation of said guide member with the rotation of said lower seat and to permit movement of said lower seat, transverse to its said lateral movement, relative to said guide member, and a rocker member disposed within said guide member adapted to be supported on said truck and supporting said lower seat, whereby maintenance of parallel and vertical alignment of said seats will be permitted during their relative lateral movement.

9. In a centering device for a railroad truck, comprising upper and lower roller seats having rollers interposed therebetween to provide for their relative lateral movement and adjustment, a frame adapted to maintain said seats in alignment, a guide member rotatably disposed beneath the lower seat and having upward extensions formed on its sides, said lower seat having downwardly extending flanges adapted to coact with said extensions to effect positive rotation of said guide member with the rotation of said lower seat and to permit movement of said lower seat, transverse to its said lateral movement, relative to said guide member, and said guide member having ribs formed on its inner sides, a rocker member disposed in said guide member adapted to be supported on said truck and supporting said seats, said rocker member having upwardly extending arms formed thereon adjacent said ribs, and said rocker member being limited in its travel and engaged by said ribs and having a positive rolling motion, whereby maintenance of parallel and vertical alignment of said seats will be permitted during said relative lateral movement.

10. In a centering device for a locomotive truck, the combination of upper and lower roller seats having rollers interposed therebetween to provide for their relative lateral movement and adjustment, a frame for said seats and rollers, the upper roller seat being adapted to be secured to the frame of the locomotive, a socket adapted to be secured on said truck beneath the lower roller seat, a guide member rotatably disposed within said socket having upward extensions formed on its sides, said lower seat having downwardly extending flanges adapted to co-act with said extensions to effect positive rotation of said guide member with the rotation of said lower seat and to permit movement of said lower seat, transverse to its said lateral movement, relative to said socket, and a rocker member disposed within said guide member and socket supporting said lower seat permitting said lower seat to move thereon transversely of its lateral movement, whereby relative lateral movement and adjustment of said truck and said locomotive frame will be effected by said seats and parallel and vertical alignment of said seats will be maintained by said guide member and rocker member during said relative lateral movement and adjustment.

11. In a centering device for a locomotive truck, the combination of upper and lower roller seats having rollers interposed therebetween to provide for their relative lateral movement and adjustment, a frame for said seats and rollers, the upper roller seat being adapted to be secured to the locomotive frame, a socket adapted to be secured on said truck beneath the lower seat, a guide member rotatably disposed within said socket having upward extensions formed on its sides, said lower seat having downwardly extending flanges adapted to co-act with said extensions to effect positive rotation of said guide member with the rotation of said lower seat and to permit movement of said lower seat, transverse to its said lateral movement, relative to said socket, a rocker member disposed within said guide member and socket supporting said lower seat and permitting said lower seat to move thereon transversely of its lateral movement, said guide member having ribs formed on its inner sides and said rocker member comprising upwardly extending arms adjacent said ribs limiting its travel and engaged by said ribs and having a positive rolling motion, whereby relative lateral movement and adjustment of said truck and said locomotive frame will be effected by said seats and parallel and vertical adjustment of said seats will be maintained by said guide member and rocker member during said relative lateral movement.

12. A device for interposition between a locomotive superstructure portion and a truck portion for transmitting a part of the load of the former to the latter, comprising a centering device having upper and lower relatively movable parts, one of said centering device parts being adapted to be disposed adjacent one of said portions, and a separate rocker member having oppositely disposed upper and lower faces, one of said rocker member faces being in rolling engagement with the other of said centering device parts at its longitudinal center line, whereby said engaging centering device part and said rocker member face will be permitted relative tilting movement to permit said two centering device parts to be maintained against relative transverse tilting, and the other of said rocker member faces being adapted for rolling engagement with the other of said portions, said centering device parts and said rocker member being adapted to cooperate to transmit said load to said truck portion and being normally in vertical alignment.

13. A device for interposition between a locomotive superstructure and a truck for transmitting a part of the load of the formed to the latter, comprising a centering device having an upper part adapted to be engaged with said superstructure and a lower part movable relative to said upper part, and a separate rocker member having oppositely disposed upper and lower faces, said upper rocker member face being in rolling engagement with said lower centering device part at its longitudinal center line, whereby said lower centering device part and said upper rocker member face will be permitted relative tilting movement to permit said centering device parts to be maintained against relative transverse tilting, and said lower rocker member face being adapted for rolling engagement with said truck, said two centering device parts and said rocker member being adapted to cooperate to transmit said load to said truck and being normally in vertical alignment.

JAMES G. BLUNT.